May 30, 1967 K. E. FAIVER ET AL 3,322,471
ANTI-SKID BRAKE DEVICE
Filed Oct. 6, 1965 2 Sheets-Sheet 1

INVENTORS
KENNETH E. FAIVER
ANDREW K. WATT
BY
Donald P. Selwicki
ATTORNEY

May 30, 1967  K. E. FAIVER ET AL  3,322,471
ANTI-SKID BRAKE DEVICE
Filed Oct. 6, 1965  2 Sheets-Sheet 2

INVENTORS
KENNETH E. FAIVER
ANDREW K. WATT
BY
Donald P. Schnecke
ATTORNEY

United States Patent Office 3,322,471
Patented May 30, 1967

3,322,471
ANTI-SKID BRAKE DEVICE
Kenneth E. Faiver and Andrew K. Watt, Lansing, Mich., assignors to General Motors Corporation, Detroit, Mich., a corporation of Delaware
Filed Oct. 6, 1965, Ser. No. 493,495
7 Claims. (Cl. 303—21)

This invention relates to vehicle braking apparatus and more particularly to a device which prevents brake lock-up and, consequently, skidding of the vehicle.

In vehicle braking systems of common design, no provision is made for preventing brake lock-up during periods of panic braking and, therefore, vehicle skid is often experienced. It is desirable to shut off braking pressure to a wheel which is not rotating during the braking of a vehicle because of the adverse sliding friction being experienced relative to a road surface rather than the more desirable rolling friction. Certain anti-skid devices exist in the prior art which involve mechanism for shutting off further braking pressure to a wheel which is likely to skid. None of the prior art systems, however, utilizes both wheel deceleration and vehicle deceleration to effectively prevent wheel lock-up.

A wheel is much more likely to skid with a given brake pressure input on a wet surface, for example, than on a dry surface. Vehicle deceleration is obviously much lower when a vehicle is incipiently skidding on a wet surface than when incipiently skidding on a dry surface. Wheel lock-up on a wet surface is likely to occur earlier than on a dry surface for this reason. Therefore, a system which fails to distinguish between wheel deceleration and vehicle deceleration would release braking pressure on a dry and on a wet surface indiscriminately. Therefore, the sought after goal of minimum stopping distance is not achieved using systems in the prior art under conditions of a wet road surface and under conditions of dry road surface, said systems being responsive to wheel deceleration only a vehicle deceleration only. The present invention distinguishes between vehicle deceleration and wheel deceleration and compensates for a situation where vehicle deceleration is disproportionate to wheel deceleration or vice versa. Therefore, the present invention responds quickly to relieve the braking pressure when vehicle deceleration is small in proportion to wheel deceleration and delays the action when the vehicle deceleration is large compared to wheel deceleration, in which case more braking pressure can be tolerated before wheel lock-up actually occurs.

The subject device is responsive to wheel deceleration and also to vehicle deceleration. Therefore, the subject mechanism operates to shut off and reduce braking pressure to a braked wheel almost immediately when certain predetermined design limits are exceeded but acts in a delayed manner to shut off or reduce braking pressure when wheel deceleration reaches a certain predetermined point but when vehicle deceleration also exceeds a certain predetermined point. Therefore, the subject device is adapted to discriminate between a wet and dry road surface, for example, where a dry road surface will allow a greater deceleration without skidding than will a wet surface. In this manner, the optimum braking capability under given road conditions is always had, therefore, minimizing the stopping distance requirement under all types of road conditions and not just under selected conditions.

It is an object of the present invention to provide an improved brake anti-lock device which is responsive to wheel deceleration and adjusted for vehicle deceleration.

It is another object of the present invention to provide an improved brake anti-lock device which measures a differential between rotational speed of a wheel and rotation speed of a control unit to shut off braking pressure to an affected wheel when the differential exceeds certain predetermined limits.

It is still another object of the present invention to provide an improved brake anti-lock device which compensates for vehicle deceleration while carrying out the purpose of the aforementioned object.

It is a further object of the present invention to provide an improved brake anti-lock device which utilizes a second pressure source to positively control the shut off valve to vehicle wheel brakes.

It is yet a further object of the present invention to provide an improved brake anti-lock device which is readily adaptable for use in braking systems of common design.

Further objects and advantages of the present invention will be apparent from the following description, reference being had to the accompanying drawings wherein preferred embodiments of the present invention are clearly shown.

Figure 1:
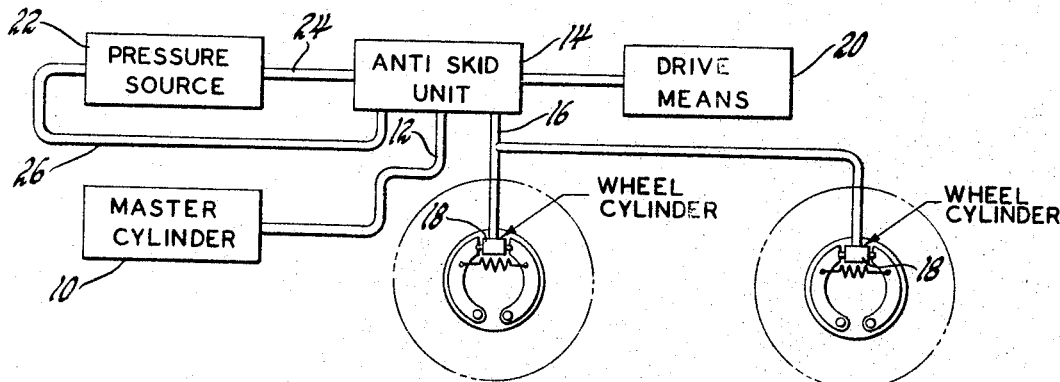
FIGURE 1 is a schematic illustration of the subject invention in its operative environment.

Referring to FIGURE 1, a master cylinder 10 has an inlet line 12 into an anti-skid or brake anti-lock unit 14. An outlet line 16 from unit 14 communicates pressure to wheel cylinders 18. In the schematic view shown, both wheel cylinders, for example, the rear wheels of the vehicle, are simultaneously controlled by a single brake anti-lock unit. It is understood that one of these units could be used to control individual wheel cylinders if desired. Drive means 20 rotationally moves a portion of the brake anti-lock unit in a manner to be hereinafter described and can be a belt drive from the transmission of the vehicle or gear driven through reduction gears from a vehicle wheel. In the example shown, a belt drive from a vehicle transmission is illustrated. A pressure source 22, sometimes referred to herein as the second pressure source, has an inlet 24 into unit 14 and a return line 26 to drain therefrom. Pressure source 22 can be a pump driven by the engine to supply a fluid pressure constantly or could be pressure tapped from a vehicle automatic transmission, as shown in the preferred embodiment.

Figure 2:
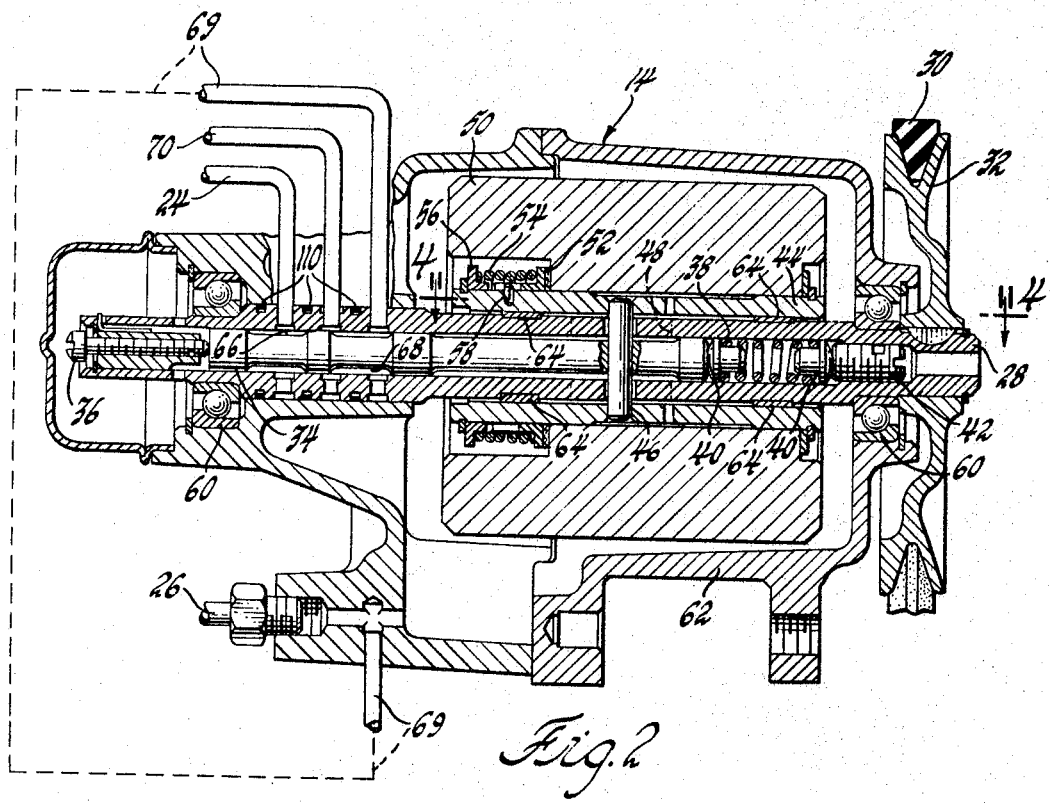
FIGURE 2 is a sectional view of one portion of the subject invention.
Figure 4:
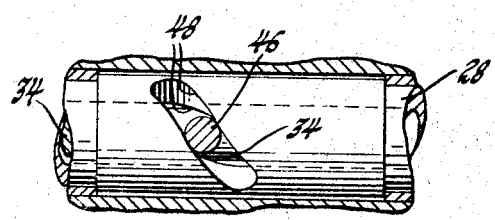
FIGURE 4 is a partial sectional view taken along line 4—4 of FIGURE 2.

Referring to FIGURE 2, shaft 28 is driven by belt 30 connecting pulley 32 and drive means 20 in any well-known fashion. Shaft 28 is hollow and houses spool valve 34 in the center thereof. Spool valve 34 is normally positioned against adjustable stop 36 by the force of spring 38 compressed between retainers 40. One of the retainers 40 is positioned against adjustable stop 42. Retainers 40 are resigned to minimize torque transmission between spool valve 34 and shaft 28. Sleeve 44 is rotatable and slidable with respect to shaft 28 and carries pin 46. Pin 46 firmly engages opposite sides of sleeve 44 and passes through slot 48 in shaft 28 and engages a diametrical hole in spool valve 34. Slot 48, as better seen in FIGURE 4, is spiral in shape and, therefore, it is seen that rotational movement of shaft 28 relative to sleeve 44 will result in axial movement of pin 46, spool valve 34, and sleeve 44, all with respect to shaft 28.

Weight 50, sometimes referred to herein as inertia means, is carried on the outer periphery of sleeve 44 and is adapted to be rotatable with respect thereto. Weight 50 frictionally engages adjustable clutch plate 52 and normally follows the rotation of sleeve 44, clutch plate 52 being biased by spring 54 into spring stop 56 carried by sleeve 44. Pin 58 controllably positions clutch plate 52 on sleeve 44, thereby preventing rotation between clutch plate 52 and sleeve 44. Bearings 60 support shaft 28 on opposite ends to allow free rotation thereof with respect to housing 62. Low friction bearings 64, preferably of a material such as Teflon, allow free rotation and sliding between sleeve 44 and shaft 28.

Inlet 24 from pressure source 22 normally communicates with groove 66 of spool valve 34 and groove 68 normally provides a path for fluid communication between outlet 69 through housing 62 to return line 26 to pressure source 22, and outlet 70 to another chamber of housing 62.

Figure 3:
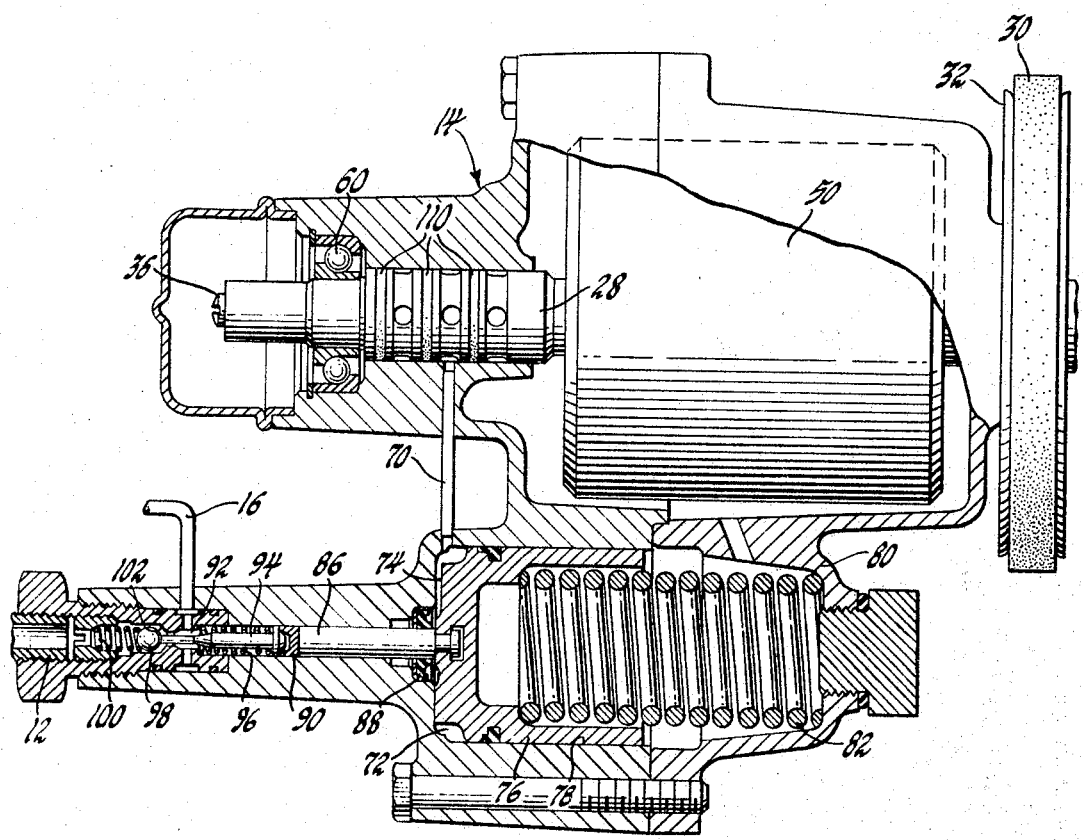
FIGURE 3 is a sectional view of another portion of the subject invention.

Referring to FIGURE 3, outlet 70 communicates with chamber 72 formed in housing 62 and enclosed by the power side 74 of piston 76. Piston 76 is slidable in bore 78 and is biased away from wall 80 by spring 82. Drive rod 86 engages piston 76 and is responsive to movement thereof. Seal 88 encompasses rod 86 and prevents the casual transfer of fluid between chamber 72 and chamber 92 and seal 90 minimizes fluid transfer toward seal 88. Push rod 94 is positioned against seal 90 and is responsive to movement of drive rod 86. Spring 96 biases push rod 94 against seal 90. Ball check valve 98 is responsive to movement of push rod 94 and is biased by spring 100. Ball 98 is movable into engagement with seat 102 to shut off fluid communication between inlet 12 and outlet 16. It is thus seen that movement of piston 76 can be translated into movement of ball 98 through rod 86 and drive rod 94. The normal position of ball 98 is off seat 102 due to pressure exerted by spring 82 against piston 76 and finally through rods 86 and 94.

Figure 5:
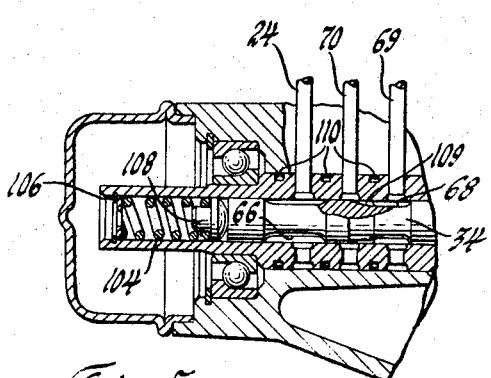
FIGURE 5 is a sectional view of another embodiment of the subject invention.

Another embodiment of spool valve 34 is seen in FIGURE 5 with spring 104 being compressed between end plug 106 of shaft 28 and spring retainer 108 bearing against the end of spool valve 34. Retainer 108 is of the same type as retainers 40 which will minimize transmission torque between shaft 28 and associated mechanism in housing 62. Seals 110 in FIGURE 5 are identical to the seals 110 in FIGURE 2 carried by shaft 28 to prevent the casual passage of fluid between inlet 24 and outlets 69 and 70.

In operation, referring to FIGURE 2, shaft 28 rotates at a speed proportional to vehicle wheel speed. As previously stated, shaft 28 is driven in the preferred embodiment by pulley 32 and belt 30, connected, for example, to the propeller output shaft of the vehicle transmission. When so driven, anti-lock device 14 is utilized to simultaneously control both rear wheel brakes of a vehicle. Shaft 28, in any desired installation, could be driven by a reduction gear arrangement from any vehicle wheel whose braking force it is desired to control.

Rotation of shaft 28 results in the rotation of sleeve 44 and inertia means 50 frictionally engaging sleeve 44. Pin 46 will assume the position seen in FIGURE 2 relative to shaft 28 and, therefore, spool valve 34 rests against adjustable stop 36. While in this position, fluid pressure from source 22 is transmitted through inlet 24 and acts in groove 66. Groove 66 is isolated from outlet 70 which is a path for fluid communication to chamber 72. Chamber 72 therefore communicates with drain 26 through outlet 70 and outlet 69 when groove 68 is appropriately positioned. Therefore, piston 76 is substantially in the position as viewed in FIGURE 3 and braking pressure between inlet 12 and outlet 16 is uninterrupted.

Under normal operating conditions, as during non-braking conditions, inertia means 50 engages clutch plate 52 of sleeve 44 and, therefore, follows sleeve 44 in its rotation with shaft 28. It should be understood that sleeve 44 follows shaft 28 because spring 38 acting against one end of spool valve 34 maintains spool valve 34 against stop 36 in the position shown in FIGURE 2. Pin 46 is directly connected to spool valve 34 and normally disposed in the forwardmost portion of spiral slot 48 formed in shaft 28. Therefore, spool valve 34 is normally located in its forwardmost position against stop 36 and normal fluid communication is had between inlet 12 and outlet 16, as pin 46 fixes the normal angular relationship of sleeve 44 and shaft 28.

When shaft 28, after rotating at a given speed, which is approximated by inertia means 50, is abruptly decelerated, such as occurs when the vehicle wheel is rapidly braked, inertia means 50 tends to rotate at the steady state speed. When this occurs, inertia means 50 by its engagement with clutch 52 will tend to rotate sleeve 44 at the same rate of speed. Therefore, sleeve 44 will tend to rotate at a faster speed than shaft 28, causing pin 46 engaging spool valve 34 to move in spiral slot 48. Spool valve 34 will turn as it follows pin 46 and will move to the right, as viewed in FIGURE 2, against the force of spring 38. When groove 66 of spool valve 34 moves sufficiently to allow a communication of the pressure in inlet 24 to outlet 70, the pressure will be transmitted to chamber 72.

Referring to FIGURE 3, pressure build-up in chamber 72 acts against the power side 74 of piston 76 driving it toward wall 80 against the force of spring 82. Drive rod 86 will follow this movement of piston 76 and spring 96 will cause push rod 94 to follow drive rod 86. When the movement of piston 76, rod 86, and rod 94 is sufficient, ball 98 will be driven against seat 102 by spring 100, thereby cutting off braking pressure communication between inlet 12 and outlet 16.

Pressure will then be trapped in chamber 92 and outlet 16 until further movement of piston 76 takes place, allowing spring 96 to drive push rod 94 in the direction of piston 76. This effectively enlarges chamber 92, thereby reducing the braking pressure in outlet 16. Thus, braking pressure is reduced in wheel cylinder 18. While in this condition, further brake pedal force is not transmitted to the wheel cylinders due to the seating of valve 98. The cycle herein described is the normal cycling of the anti-lock device when either panic braking occurs on a dry road surface or relatively heavy braking occurs on a wet road surface. The reason for this differentiation is explained in the following cycle of operation.

When braking occurs while the vehicle is traveling on a dry road surface, a greater rolling friction condition can be maintained than when braking occurs on a wet road surface. Since it is desirable to obtain maximum braking force applied on a vehicle wheel as long as it is safe to do so without creating a skid, the subject invention has means for sensing vehicle deceleration, which function is proportional to the rolling friction between tire and road surface for a given force applied to the brakes. Therefore, in order to avoid premature shutting off of brake pressure to a braked wheel, the following cycle occurs.

Shaft 28 rotates at a speed proportional to the vehicle wheel. When shaft 28 is rapidly decelerated, such as by heavy braking of the vehicle, a rapid deceleration of the vehicle occurs if rolling friction is maintained between the tire and the road surface. This is a likely situation on a dry road surface.

Deceleration of the car, which is traveling toward the left, with reference to FIGURE 2, causes inertia means 50 to tend to continue to travel toward the left at its original speed it had before braking was initiated. Of course, the greater the car deceleration, the greater will be the force exerted toward the left by inertia means 50. Since sleeve 44, together with inertia weight 50, which is mounted on sleeve 44, are slidable as well as rotatable with respect to shaft 28, and since rotation of sleeve 44 with respect to shaft 28 causes sleeve 44 together with weight 50 and valve 34 to move toward the right in FIGURE 2, it is obvious that the forward inertial force exerted by weight 50 due to car deceleration opposes the rightward movement of weight 50 and sleeve 44, induced by rotational deceleration of shaft 28. Thus, it is seen that the linear inertial force of weight 50 tends to compensate for the rotational inertial force of weight 50 exerted on pin 46 through cam spiral slot 48. This compensation is proportional to the amount of car deceleration with respect to wheel deceleration. Therefore, greater wheel or rotational deceleration is required to translate valve 34 axially and actuate the valve ports, which in turn set up the conditions for reducing applied brake pressure.

Thus, the device senses both wheel deceleration and car deceleration and thereby is able to modulate the amount of braking in an incipient skid condition by a factor proportional to road surface. That is, optimum anti-skid braking is indicated regardless of road conditions.

It should be noted that this rapid vehicle deceleration is experienced only while rolling friction is being experienced between the vehicle wheel and the road surface. At the instant rolling friction is converted to sliding friction, vehicle deceleration decreases making inertia weight 50 less responsive linearly.

Another embodiment of spool valve 34 is shown in FIGURE 5. In this illustration, the adjustable stop 36 is replaced by spring 104 and spring retainer 108 serving to hold spool valve 34 in its poised position.

In this embodiment, when rapid vehicle deceleration takes place and inertia means 50 slides axially with sleeve 44 on shaft 28, pin 46 can act against spool valve 34 to move it slightly to the left, as viewed in FIGURE 5. Again, angular wheel deceleration is compensated by linear vehicle deceleration. In addition, in this embodiment, spool valve 34 has a relief 109 which bleeds pressure down in a normal position so that chamber 72 is normally at atmospheric pressure even after slight movement of spool valve 34 has taken place. The incorporation of the features illustrated in FIGURE 5 are adapted to make the invention more or less responsive in a given installation depending on operating conditions that are likely to be experienced by the vehicle. It is understood that the response rate of the subject mechanism can also be varied in many ways, for example, by changing operating pressures, spring forces, or distances to be traveled, without departing from the spirit of the invention.

The subject invention finds particular utility in an environment of a vehicle having wheel brakes for stopping the vehicle. As previously stated, pressure source 22 can be the transmission of a vehicle or an independent fluid pump driven by an engine or driven electrically. The drive means 20 can be pulley driven by the output shaft of the vehicle transmission or can be driven through reduction gears directly by the vehicle wheel. It is also apparent that the subject invention is adaptable for use with any type of fluid operated brake, whether air or hydraulic, while still maintaining the inventive features. The ability of the subject invention to compensate for deceleration of the vehicle while being responsive to wheel deceleration is considered to be a very important feature differentiating the subjct device in function from prior art devices while the structure shown to accomplish the desired result is, consequently, novel.

While the embodiments of the present invention, as herein disclosed, constitute preferred forms, it is to be understood that other forms might be adopted.

What is claimed is as follows:

1. A brake anti-lock device for a vehicle having fluid actuated wheel brakes, said device comprising: a brake master cylinder for developing a fluid pressure; brake actuation and output line therefor; a fluid pressure source driven by a vehicle engine; first valve means driven rotationally at a speed proportional to wheel rotation; second valve means interposed in said output line and responsive to pressure from said fluid pressure source; a housing having portions therein in which said first and second valve means are slidably disposed; inlet means in said housing from said brake master cylinder and from said fluid pressure source; and inertia means rotatably carried by said first valve means and arranged to be rotatable and slidable relative thereto, said inertia means being responsive to a predetermined change in rotational velocity of said first valve means to reposition said first valve means in said housing thereby communicating pressure from said fluid pressure source to said second valve means to shut off braking to at least one vehicle wheel, said inertia means being responsive to vehicle deceleration to slide on said first valve means to modify the response of said inertia means to rotational velocity of said first valve means.

2. A brake anti-lock device according to claim 1 wherein said first valve means selectively routes pressurized fluid from said fluid pressure source to said second valve means and pressurized fluid from said second valve means to a drain of said fluid pressure source during various conditions of relative velocity of said first valve means and said inertia means.

3. A brake anti-lock device for a vehicle wheel rotationally impedable by fluid actuated brakes, said device comprising: a housing; a first pressure source for developing a braking pressure and communicating pressure to said housing; a second pressure source communicating pressure to said housing and being driven by the vehicle engine; first inlet means in said housing from said first pressure source and first outlet means to the fluid actuated brakes; second inlet means from said second pressure source; second outlet means to a return to said second pressure source; third outlet means from said housing; first valve means including friction means rotatably driven by said vehicle at a speed proportional to the rotational speed of the vehicle wheels and being slidable in said housing to selectively route pressure from said second inlet means of said second pressure source between the return to said second pressure source and to said third outlet means; second valve means slidable in said housing and including a first portion responsive to pressure at said third outlet means to move a second portion into a position isolating said first inlet means from said first outlet means; and inertia means normally rotatable with said first valve means and responsive to rapid changes in vehicle wheel rotational speed and to rapid deceleration of said vehicle to slide on said first valve means to control sliding movement of said first valve means thereby routing pressure from said second pressure source to said second valve means to interrupt the communication of pressure between said first inlet means and said first outlet means when vehicle or wheel deceleration exceeds certain predetermined limits, said inertia means engaging said friction means during rapid vehicle deceleration thereby more closely approximating the rotational speed of said first valve means to modify the shifting rate thereof.

4. A brake anti-lock device according to claim 3 wherein said first valve means comprises: a drive means rotated at a velocity proportional to vehicle wheel speed; a spool valve slidable axially in said drive means and biased away from a portion of said drive means to a position where free fluid communication is maintained between said third outlet means and the return line to said second pressure source; sleeve means circumferentially disposed on said drive means and arranged to rotate therewith; auxiliary drive means engaging said sleeve means and said spool valve while movable in a spiral slot formed in said drive means; and clutch means carried by said sleeve means and frictionally engageable with said inertia means, said inertia means normally rotatable with said sleeve means and responsive to sudden decreases in rotational speed of said drive means to move said sleeve means at a different rotational speed than said drive means thereby camming in said spiral slot and moving said spool valve against its bias to cause a repositioning of said spool valve relative to said return line thereby communicating pressure from said second pressure source to said second valve means, said inertia means being responsive to sudden deceleration of said vehicle to thrust axially against said sleeve means restricting movement thereof axially on said drive means to modulate the force applied against said spool valve by the camming of the auxiliary drive means in the spiral slot caused by differences in rotational speeds between said drive means and said inertia means.

5. A brake anti-lock device according to claim 3 wherein said second valve means comprises: a piston slidable in a portion of said housing and being biased away from one wall of said housing; and a ball check valve disposed in said housing and adapted to isolate sad first inlet means from said first outlet means in response to pressure from said second pressure source selectively routed to the force side of said piston by said first valve means during periods of brake initiated wheel deceleration tending to lock the vehicle wheels.

6. A brake anti-lock device according to claim 4 wherein said spool valve is spring balanced within said drive means and said spool valve having means arranged to normally maintain said second valve means at atmospheric pressure.

7. A brake anti-lock device for a vehicle wheel rotationally impedable by fluid actuated brakes, said device comprising: a housing carried by a fixed portion of a vehicle and having a fluid communicating path between the brake master cylinder and the vehicle wheel passing therethrough; transmission generated fluid pressure source including an inlet into said housing, an outlet to a drain from said housing and an outlet from a first portion of said housing into a second portion of said housing; valve means including friction means rotationally drivable at a speed proportional to vehicle wheel speed being slidably disposed in the first portion of said housing and adapted to selectively establish a path for fluid communication between said transmission generated fluid pressure source to said second portion of said housing under conditions of rapid vehicle deceleration and between said transmission generated fluid pressure source and a drain thereto under normal operating conditions; second valve means responsive to pressure from said transmission generated fluid pressure source to selectively cut off fluid communication from said brake master cylinder to said vehicle brakes; an inertia device arranged to rotate with said first valve means under normal operating conditions and being arranged to slide on said first valve means to rotationally and axially drive said first valve means into a position where fluid communication is had between said transmission generated fluid pressure source and said second valve means under conditions of rapid wheel deceleration, the response to said second valve means being controllably modulated by axial thrusting of said inertia device into said friction means during periods of rapid vehicle deceleration.

References Cited

UNITED STATES PATENTS

| | | |
|---|---|---|
| 2,012,366 | 8/1935 | Wevers. |
| 2,163,731 | 6/1939 | Hallot. |
| 2,964,048 | 12/1960 | Mortimer _____ 303—24 |
| 3,073,405 | 1/1963 | Hill et al. |

FOREIGN PATENTS

| | | |
|---|---|---|
| 962,933 | 7/1964 | Great Britain. |

EUGENE G. BOTZ, *Primary Examiner.*